United States Patent Office 3,230,275
Patented Jan. 18, 1966

3,230,275
INTERPOLYMERS COMPRISING ACRYLAMIDE AND A HYDROXY-SUBSTITUTED MONOMER AND HEAT CURABLE RESIN COMPOSITIONS THEREWITH
Kazys Sekmakas, Chicago, Ill., assignor to De Soto Chemical Coatings, Inc., Chicago, Ill., a corporation of Delaware
No Drawing. Filed Aug. 30, 1962, Ser. No. 220,566
15 Claims. (Cl. 260—873)

The present invention relates to acrylamide interpolymers containing copolymerized aliphatic monoethylenically unsaturated monomer containing the hydroxy group providing heat-curing products which cure to form hard, flexible and solvent resistant coatings which may possess high gloss. These new copolymers or interpolymers in accordance with the invention are especially useful in organic solvent solution coating compositions, especially in admixture with solvent-soluble, heat-hardenable aminoplast resins, either alone or in combination with oil-modified alkyd resin. In the present invention, the acrylamide interpolymer may be alkylolated by reaction with aldehyde if desired, but excellent properties are achieved in the absence of aldehyde reaction.

Etherified alkylolated acrylamide-containing interpolymers have previously been used in organic solvent solution coating compositions. In the known systems, alkylolation of the interpolymer is essential to the cure and, when the alkylolated interpolymer is prepared in the presence of acid, extensive etherification has been essential to the storage stability of the system. Moreover, when the interpolymer is the sole film-forming component of the coating, it is not normally possible to obtain a fully satisfactory combination of properties. Blending with epoxy resins is of some assistance, but such resins tend to degrade gloss upon prolonged exposure. Blending with aminoplast resins or alkyd resins is also of some assistance, but poor compatibility has led to many problems, such as pigment flocculation, color drift in the package, and loss of gloss.

In accordance with the invention, an acrylamide is copolymerized with other polymerizable ethylenically unsaturated materials including at least 20% by weight of monoethylenically unsaturated ester component in which the terminal carbon chain is of sufficient length to provide extensive internal plasticization, and a proportion of aliphatic monoethylenically unsaturated monomer containing the hydroxy group. Desirably, a proportion of aliphatic monoethylenically unsaturated carboxylic acid is also included in the copolymer or interpolymer.

A portion of the amido hydrogen atoms in the interpolymer may be replaced by the structure

wherein R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical. Preferably, R is hydrogen and, to the extent that etherification is desired or permitted, the etherifying alcohol provides an ether group in which $R_1$ is an alkyl radical containing from 3–8 carbon atoms.

As will be more fully appreciated hereinafter, considerable variation is permissible in the kind and ratio of ethylenically unsaturated materials which are used, the aldehyde modifying agent, the etherifying agent and the extent of etherification.

The preferred unsaturated amide is acrylamide, but other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used.

It is preferred to employ the acrylamide monomer in proportions of from 5 to 45%, preferably from 5 to 30% by weight, based on the total weight of unsaturated material subjected to copolymerization.

As will later more fully appear, the presence of the acrylamide component is essential for, in its absence, the interpolymer fails to cure sufficiently to provide a hard and solvent resistant film.

A second essential component is aliphatic unsaturated monomer containing the hydroxyl group. The preferred hydroxyl-containing monomers are 2-hydroxy ethyl methacrylate and glycerol allyl ether, though these are merely illustrative of the class which also includes other hydroxy alkyl methacrylates and acrylates such as 2-hydroxy propyl methacrylate, 3-hydroxy propyl methacrylate, 4-hydroxy butyl methacrylate, and 2-hydroxy ethyl acrylate. Still further hydroxy-containing monomers which may be used are ethylene glycol allyl ether, propylene glycol allyl ether, butylene glycol allyl ether, diethylene glycol allyl ether, trimethylol propane allyl ether and 2-hydroxy-methyl-5-norbornene (either the endo isomer or the exo isomer or mixtures thereof). Still further, allyl alcohol, methallyl alcohol, crotyl alcohol and unsaturated fatty alcohols corresponding to drying oil fatty acids may be used.

In order to provide sufficient hydroxyl functionality in the interpolymer to permit the curing mechanism of the invention to perform effectively, the hydroxy-containing monomer should be used in an amount of at least 2% by weight, preferably at least 4% by weight, based on the total weight of ethylenically unsaturated monomers which are copolymerized. Normally, it is not desirable to include more than 25% by weight of the hydroxy-containing monomer and, usually, less than 15% by weight is desirably used.

Interpolymers containing copolymerized acrylamide and unsaturated hydroxyl-containing monomer cross-link extensively upon heat curing and cured coatings tend to be excessively brittle. This brittleness is particularly apparent and detrimental when the interpolymer includes large proportions of styrene, vinyl toluene or methyl methacrylate providing products of little value.

It is therefore essential that the interpolymer include at least 20% by weight, and preferably at least 40% by weight of monoethylenically unsaturated ester in which the terminal carbon chain is of sufficient length to provide extensive internal plasticization. This is most desirably achieved using acrylate esters with alkanols containing at least 2 carbon atoms, and preferably with a proportion of acrylate ester in which the terminal carbon chain contains at least 6 carbon atoms. Methacrylate esters containing 3 or more carbon atoms in the terminal carbon chain may also be used. Maleate, fumarate, crotonate esters and diesters with alkanols containing at least 2 carbon atoms are also usable, such as dibutyl maleate and dibutyl fumarate.

While monomers such as styrene, vinyl toluene, and methyl methacrylate are desirably present in the interpolymer, the proportion thereof should be less than 40% and preferably should be less than 30%.

It is preferred to employ a minor proportion of aliphatic monoethylenically unsaturated carboxylic acid such as acrylic acid, methacrylic acid, crotonic acid, fumaric acid, maleic acid, monoethyl maleate, etc., for this enhances the cure leading to coatings of somewhat increased hardness and flexibility. However, the presence of free carboxyl radicals in the interpolymer is not essential since exceptionally hard, flexible and compatible polymers are achieved even in the absence of carboxyl functionality.

The proportion of aliphatic monoethylenically unsaturated carboxylic acid is desirably quite small, e.g., in the range of from 1–15% by weight, and more preferably in the range of from 2–8% by weight.

For best results, from 2–5% of an acid such as acrylic or methacrylic acid is employed.

Any balance of the interpolymer may be any polymerizable ethylenically unsaturated material. While monoethylenically unsaturated monomers are preferred, especially when they contain the $CH_2=C<$ group, other ethylenically unsaturated material may be used, such as the unsaturated polyester resins disclosed in my copending application Serial No. 115,330, filed June 7, 1961, now United States Patent No. 3,163,615, the disclosure of which is hereby incorporated by reference.

Stated briefly, one may incorporate 5% or more of unsaturated polyester resin containing from 0.005 to 0.40 gram mol of ethylenically unsaturated component per 100 grams of polyester, especially polyesters in which the unsaturation in the polyester is substantially confined to side chains in the polyester structure as by the use of a monoethylenically unsaturated monofunctional component such as crotonic acid or allyl alcohol in an amount to provide from 0.03–0.3 gram mol of unsaturated component per 100 grams of polyester.

Other ethylenically unsaturated materials which may be present are illustrated by acrylonitrile, vinyl acetate, vinyl stearate, butene-1, butene-2, unsaturated fatty acids such as dehydrated castor oil fatty acids, 1,3-butadiene, n-butyl vinyl ether, etc.

The interpolymers of the invention are desirably produced by a single stage solution copolymerization in which the monomers are dissolved in an organic solvent which is also a solvent for the interpolymer which is formed and copolymerization is effected in the presence of a free-radical generating polymerization catalyst, elevated temperatures being normally used to speed the reaction.

While the amido hydrogen atoms of the unsaturated amide component, e.g., the acrylamide monomer, are normally left unreacted in the interpolymer, they may be alkylolated by reaction with monoaldehyde. This is achieved in a single stage solution compolymerization which is more fully described in my prior copending application Serial No. 100,804, filed April 5, 1961, now United States Patent No. 3,163,623, the disclosure of which is hereby incorporated by reference. Thus, when alkylolation is desired, organic solvent, aldehyde, an acrylamide and the other ethylenically unsaturated materials are reacted with one another in the presence of heat and in the presence of a basic catalyst and a free-radical generating polymerization catalyst, and polymerization and alkylation take place simultaneously.

The alkaline catalyst is essential to the single stage reaction, including alkylolation, for its absence leads to the production of an insoluble gelled structure which is not useful.

At least 0.1% of alkaline catalyst, based on the weight of monomers being copolymerized, is essential to avoid gelation. One the other hand, it is preferred to use not more than 1.0% of alkaline catalyst because the products so-produced have slow curing properties and are less desirable.

Any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred. The degree of etherification may be changed, and thereby controlled, by changing the amount of alkaline catalyst which is employed.

In the presence of alcohol and with continuous removal of water, as by refluxing coupled with azeotropic distillation, etherification takes place at the same time and some of the methylol groups in the alkylolated product may be etherified if desired.

The aldehyde modifying agent, when used, is desirably used in an amount of from 0.2–5 equivalents of aldehyde, and preferably in an amount of from 1–2 equivalents of aldehyde for each amide group used in the formation of the acrylamide interpolymer. The preferred aldehyde is formaldehyde. Other monoaldehydes, including acetaldehyde, propionaldehyde, butyraldehyde, and furfural, or substances yielding an aldehyde, such as paraformaldehyde, hexamethylene tetramine or trioxymethylene can also be used.

Etherification of the aldehyde-modified amide interpolymer may be employed, but is not essential. Lower alcohols containing up to 10 carbon atoms, especially butanol, are preferred for etherification and the etherification reaction may be carried out up to 100% of the alkylol radical present in the interpolymer although partial etherification is preferred. The degree of etherification is easily controlled in accordance with the invention by adjusting the proportion of alkaline catalyst, and by controlling the proportion of water removed, such control being a feature of the invention. When less than 100% etherification is effected, the product is a mixture in which the amido hydrogen atoms in some of the acrylamide interpolymer molecules are replaced by the structure —ROH, and the amido hydrogen atoms in other of the acrylamide interpolymer molecules are replaced by the structure —ROR$_1$, R representing a saturated aliphatic hydrocarbon radical introduced by the aldehyde modifying agent and R$_1$ is the residue of the etherifying alcohol.

Other aspects of solution copolymerization, whether including alkylolation or not, are as follows.

Preferably, the monomers are dissolved in the organic solvent which is introduced into the reaction vessel slowly and at a uniform rate (desirably by continuous addition) to permit more precise control of the reaction and to provide a more uniform interpolymer product. Also, continuous monomer addition enables temperature control during the reaction despite the highly exothermic reaction which normally occurs.

Chain terminating agents, such as mercaptans, may be used to exert their known effect of lowered average molecular weight.

Any free-radical generating polymerization catalyst may be used, the selection of catalyst being determined by the desired temperature of the polymerization reaction. The important point is that the agent liberate free radicals under the conditions of polymerization so that the addition polymerization is facilitated.

Thus, copolymerization catalysts which generate free radicals starting at low temperature, e.g., from 30–50° C. are usable, these being illustrated by acetyl benzoyl peroxide, peracetic acid, hydroxybutyl peroxide, isopropyl percarbonate, cyclohexanone peroxide, cyclohexyl peroxide, 2,4-dichlorobenzoyl peroxide, and cumene hydroperoxide.

Suitable catalysts which are active to begin generating free radicals at somewhat more elevated temperatures of about 60° C. are illustrated by t-butyl hydroperoxide, methyl amyl ketone peroxide, acetyl hydroperoxide, lauroyl peroxide, methyl cyclohexyl hydroperoxide, t-butyl permaleic acid, t-butyl perbenzoate, di-t-butyl diperphthalate, N,N'-azodiisobutyronitrile and benzoyl peroxide.

Preferably, free-radical generating catalysts which become active at still more elevated temperatures of about 100° C. are used in accordance with the invention, these being allustrated by t-butyl perphthalic acid, p-chlorobenzoyl peroxide, t-butyl peracetate, dibenzal diperoxide and di-t-butyl peroxide.

The particular nature of the organic solvent used for the solution copolymerization or for the solvent solution application of the interpolymers or mixtures containing the same is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, Cellosolve, butyl Cellosolve, etc.

The present invention is especially directed to coating compositions which cure to provide very hard and mar-resistant coatings which, despite their hardness, are flexible and reasonably resistant to impact. For this purpose, the interpolymers of the invention which cure extensively and which possess good compatibility are used in combination with aminoplast resins, especially heat-hardening, solvent-soluble condensation products of a triazine with excess formaldehyde. As is well known, solvent solubility is usually provided by etherifying the aminoplast resin with a $C_3$–$C_8$ alcohol, preferably butanol. As a point of interest, many of the prior art acrylamide interpolymers will not tolerate more than 15% of such condensation products whereas, the invention prefers to employ 20% or more, up to about 70% of such condensation products, especially from 25–50%, based on the total weight of interpolymer and condensation product.

While the broad class of heat-hardening solvent-soluble aminoplast resins is a well known class, the invention will be illustrated by a typical aminoplast resin identified as triazine resin "A" which is used as a 60% resin solids solution of benzoguanamine-formaldehyde resin in a 50/50 weight ratio mixture of butanol/xylol. The benzoguanamine-formaldehyde resin is a condensation product of 4 mols of formaldehyde with 1 mol of benzoguanamine in the presence of excess butanol and an acid catalyst to provide a heat-hardening resin etherified with butanol to provide solvent solubility. The benzoguanamine-formaldehyde resin solution has a viscosity on the Gardner-Holdt scale at 25° C. of G–K.

When hard coatings of greater flexibility are desired, with only a small sacrifice in hardness, a portion of the aminoplast resin is replaced by an oil-modified alkyd resin.

The oil-modified alkyd resin and the aminoplast resin are combined in a weight ratio of from 1:4 to 4:1, preferably in a weight ratio of from 1:1.5 to 1.5:1 and used in a total amount of from 10–70% by weight, preferably in an amount of from 20–40% by weight, based on the total weight of interpolymer, aminoplast resin and alkyd resin.

As a point of interest, while alkyd resins have previously been blended with acrylamide interpolymers, compatibility, especially with the oil-modified alkyd resins, has been unsatisfactory and the flexibilizing influence of the oil has frequently significantly degraded the hardness of the coating, in contrast with the results achieved in the invention.

While the term "oil-modified alkyd resin" is used in its broadest significance in the invention, typical alkyd resins are well known and most of these are included within the following description.

Alkyd resins are prepared by intercondensing a polyol, a polybasic acid, and an unsaturated fatty acid. Since alkyd resin chemistry is well known to those skilled in the art, it will not be discussed in detail. The preparation and physical properties of alkyd resins are described in numerous texts, such as vol. I of "Organic Coating Technology," Henry Fleming Payne, John Wiley and Sons, Inc., N.Y., 1954.

Although a wide variety of polybasic acids such as phthalic anhydride, isophathalic acid, succinic acid, 2,2,1-bicyclo endomethylene-7-heptene - 2,3-dicarboxylic acid, etc., may be utilized, the preferred acid is generally phthalic anhydride. Similarly, although a wide variety of polyols such as glycerol, trimethylol propane, pentaerythritol, sorbitol, mannitol, etc., may be utilized, the preferred polyols are generally glycerol and pentaerythritol. The polyol may be a single compound or a mixture or compounds and should contain an average of from about 2.5 to about 4.5 hydroxyl groups per molecule and, preferably, about 3 hydroxyl groups per molecule.

A wide variety of unsaturated fatty acids may be utilized in the preparation of modified alkyld resins, the source of the fatty acid normally being a naturally occurring vegetable or marine oil such as linseed oil, soybean oil, tall oil, menhaden oil, tung oil, castor oil, etc.

Frequently, minor amounts of additional components such as maleic anhydride, dimerized or bodied fatty acids, saturated fatty acids, etc., will also be utilized.

In general, the polybasic acid, polyol, and fatty acid are interreacted in proportions sufficient to provide about a 5 to 25 weight percent excess of polyol. Excess polyol may be defined as that amount of polyol in excess of the amount necessary to combine with the sum of the acid groups in the fatty acid and the polybasic acid on a theoretical basis. Alkyd resins are conventionally characterized as short oil modified alkyd resins, medium oil alkyd resins, and long oil alkyd resins, depending upon the ratio of fatty acid to the dibasic acid in the preparation of the resin. Long oil alkyd resins are normally prepared by the interreaction of about 3.1 to about 3.4 mol equivalents of polyol with about 2 mol equivalents of polycarboxylic acid and 1 mol equivalent of unsaturated fatty acid. Progressively larger amounts of polycarboxylic acid and progressively smaller amounts of unsaturated fatty acid are utilized to provide a shorter oil length. Thus, short oil alkyd resins may be prepared by the intercondensation of about 3.1 to about 3.4 mol equivalents of polyol with about 2.3 to about 2.5 mol equivalents of polycarboxylic acid and from about 0.7 to about 0.5 mol equivalent of unsaturated fatty acid.

The alkyd resin may include copolymerized vinyl monomer such as styrene or methyl methacrylate.

A typical oil-modified, heat-hardening alkyd resin in accordance with the invention, and referred to hereinafter as "Oil-Modified Alkyd Resin A," is prepared by heating a mixture of 34.1 parts by weight of dehydrated castor oil with 11 parts of glycerine and 0.03 part of lead oxide. The temperature is maintained at 450° F., until 1 part of the product is soluble in 3 parts of methyl alcohol. After cooling to 380° F., 37.6 parts of phthalic anhydride, 3.1 parts of benzoic acid and 13.9 parts of glycerine are added and the mixture is heated to 420° F. and maintained at this temperature until the viscosity is in the range of $Z_1$–$Z_2$ on the Gardner-Holdt scale at 25° C. and the product has an acid value of 3.0.

The invention is illustrated in the examples which follow:

EXAMPLE 1

A number of interpolymers are produced having the weight proportions listed in Table I which follows. Each of Interpolymers A, C, D, E and F are produced by the solvent solution copolymerization which will be described hereinafter in connection with the production of Interpolymer A. Interpolymer B, which is the same as Interpolymer A with the exception that the acrylamide is reacted with formaldehyde to methylolate substantially 1 amide hydrogen atom on each acrylamide residue in the copolymer, is produced in the same manner but with the exception that 0.15%, based on total monomers, of triethyl amine is used along with the peroxide catalysts in order that the interpolymer is formed and the formaldehyde simultaneously reacted therewith to methylolate the acrylamide groups in the interpolymer.

To briefly describe the interpolymers which are listed in Table I, Interpolymer A contains acrylamide, glycerol allyl ether as the hydroxy copolymer and a small proportion of methacrylic acid. Interpolymer B is the same as Interpolymer A with the exception that the acrylamide groups are methylolated. Interpolymer C is the same as Interpolymer A with the exception that the methacrylic acid component is omitted. Interpolymer D is the same as Interploymer A with the exception that the acrylamide component is omitted. Interpolymer E is the same as Interpolymer A with the exception that 2-hydroxy ethyl methacrylate is used as a replacement for glycerol allyl ether on an equivalent basis, based on hydroxy. Interpolymer F is the same as Interpolymer A with the exception that glycerol allyl ether is replaced by an approximately equivalent proportion of 2-hydroxymethyl-5-norbornene.

To illustrate the production of Interpolymers A–F, Interpolymer A is produced as follows:

Charge composition: Grams
- Xylol _____ 546
- n-Butanol _____ 90
- Allyl glycerol ether _____ 50
- Acrylamide _____ 90
- 2-ethoxy ethanol _____ 135
- n-Butanol _____ 45
- 2-ethyl hexyl acrylate _____ 120
- Ethyl acrylate _____ 470
- Styrene _____ 240
- Glacial methacrylic acid _____ 30
- Di-tert-butyl peroxide _____ 10
- n-Dodecyl mercaptan _____ 6
- Cumene hydroperoxide _____ 5

PROCEDURE OF POLYMERIZATION

Charge 546 grams of xylol, 90 grams of butanol and 50 grams of glycerol allyl ether into a reactor equipped with an agitator, condenser, thermometer and nitrogen inlet.

The initial charge is heated to 255–265° F. Then dissolve 90 grams acrylamide in 135 parts of 2-ethoxy ethanol and 45 grams n-butanol. To this monomer blend add all the remaining monomers and catalysts. The monomer-catalyst blend is added to the reactor over a 2½ hour period while maintaining the temperature at 255–265° F.

The mixture is maintained at 255–265° F. until conversion is complete (5–6 hours), and butanol is added to the product to provide a solution containing 51% solids.

The resins of Examples A–F are utilized in an enamel formulation containing 28% titanium dioxide and 32% non-volatile resin. The pigmented resin solutions are ground in a pebble mill to obtain a 7½ N.S. grind gauge reading.

A 0.003″ draw down of the enamels are applied to bare steel panels and baked for 20 minutes at 325° F.

The results obtained are reported in Tables II and III.

*Table I*

| Composition | Interpolymer Composition—monomer, parts by weight | | | | | |
|---|---|---|---|---|---|---|
| | A | B | C | D | E | F |
| Ethyl Acrylate | 47 | 47 | 47 | 47 | 47 | 47 |
| Styrene | 24 | 24 | 24 | 24 | 24 | 24 |
| 2-Ethyl Hexyl Acrylate | 12 | 12 | 12 | 12 | 12 | 12 |
| Glacial Methacrylic Acid | 3 | 3 | | 3 | 3 | 3 |
| Acrylamide | 9 | 9 | 9 | | 9 | 9 |
| Glycerol Allyl Ether | 5 | 5 | 5 | 5 | | |
| 2-Hydroxy Ethyl Methacrylate | | | | | 10 | |
| 2-Hydroxymethyl-5-norbornene | | | | | | 10 |
| 40% Formaldehyde solution in n-butanol | | 20 | | | | |

| | Final Characteristics of Interpolymer | | | | | |
|---|---|---|---|---|---|---|
| | A | B | C | D | E | F |
| Solids (percent) | 51 | 50.1 | 50.6 | 53.0 | 50.3 | 49.4 |
| Viscosity (Gardner-Holdt) | X | W | V-W | R | Y-Z | W-X |
| Color (Gardner-Holdt) | 2-3 | 2-3 | 2 | 1 | 1-2 | 2-3 |

*Table II*

Interpolymer solids—70%
Triazine resin A—15%
Oil modified alkyd resin A—15%

| | Modified Interpolymers | | | | | |
|---|---|---|---|---|---|---|
| | A | B | C | D | E | F |
| Gloss Reading (Photovolt 60°) | 92 | 91 | 89 | 90 | 92 | 90. |
| Pencil Hardness | 2H-3H | 2H-3H | 2H | H | 3H | 3H. |
| Flexibility (⅛″ mandrel) | Passed | Passed | Passed | Passed | Passed | Passed. |
| Impact (Forward) Inch/pounds | 20 | 25 | 20 | 20 | 25 | 20. |
| Mar Resistance | Very good | Very good | Very good | Very good | Very good | Very good. |
| Toluol Resistance | do | do | do | Poor | do | Do. |

*Table III*

Interpolymer solids—70%
Triazine resin A—30%

| | Modified Interpolymers | | | | | |
|---|---|---|---|---|---|---|
| | A | B | C | D | E | F |
| Gloss Reading (Photovolt 60°) | 94 | 92 | 90 | 91 | 92 | 90. |
| Pencil Hardness | 3H-4H | 3H-4H | 3H | 2H | 4H | 3H-4H. |
| Flexibility (¼″ mandrel) | Passed | Passed | Passed | Passed | Passed | Passed. |
| Impact (Forward) Inch/pounds | 15 | 20 | 15 | 15 | 20 | 10. |
| Mar Resistance | Excellent | Excellent | Very good | Fair | Excellent | Excellent |
| Toluol Resistance | do | do | Excellent | do | do | Do. |

The invention is further illustrated by the following examples which illustrate the utilization of various hydroxy-containing monomers in the production of methylolated acrylamide interpolymers.

EXAMPLE 2

Interpolymers are prepared having the compositions indicated in parts by weight in Table IV which follows:

*Table IV*

INTERPOLYMER COMPOSITION
[Monomer, parts by weight]

| Composition | Interpolymers | | |
|---|---|---|---|
| | A | B | C |
| Trimethylol propane monoallyl ether | 66 | | |
| 2-Hydroxy ethyl methacrylate | | 100 | |
| 2-Hydroxymethyl-5-norbornene | | | 100 |
| Ethyl acrylate | 470 | 470 | 470 |
| Styrene | 240 | 240 | 240 |
| 2-Ethyl hexyl acrylate | 120 | 120 | 120 |
| Glacial Methacrylic acid | 30 | 30 | 30 |
| Acrylamide | 90 | 90 | 90 |
| 40% solution of formaldehyde in n-butanol | 190 | 190 | 190 |

The interpolymer preparation used is illustrated by the production of Interpolymer A of the present example in the following manner:

Charge 545 grams of xylol, 90 grams of n-butanol and 66 grams of trimethylolpropane monoallyl ether into a reactor equipped with an agitator, condenser, thermometer, nitrogen inlet and Dean-Stark trap. The initial charge is heated to 255–265° F. Then dissolve 90 grams of acrylamide in 135 grams of 2-ethoxy ethanol and 45 grams of n-butanol. To this monomer blend add 6 grams n-dodecyl mercaptan, 10 grams di-t-butyl peroxide and 5 grams cumene hydroperoxide. The above monomer-catalyst blend is added to the reactor over a 2½ hour period while maintaining the mixture at 255–265° F., for a period of 5–6 hours until conversion is complete. The contents are cooled to 240° F. and 195 grams of a 40% formaldehyde solution in butanol are added. The contents are heated at reflux for an additional hour until 25 cc. of water have been distilled off, the water being collected in the Dean-Stark trap. The product is then cooled to 180° F. and filtered.

The resins of Interpolymers A, B and C are utilized in an enamel formulation containing 28% titanium dioxide and 32% non-volatile resin. The pigmented resin solutions are ground in a pebble mill to obtain a 7½ N.S. grind guage reading.

A 0.003″ draw down of the enamel is applied to bare steel panels and baked for 20 minutes at 325° F.

The interpolymers of the present example are tested to provide the properties indicated in Tables V and VI which follow:

*Table V*

Interpolymer solids—70%
Triazine resin A—30%

| | Modified Interpolymers | | |
|---|---|---|---|
| | A | B | C |
| Gloss Reading (Photovolt 60°) | 92 | 93 | 90. |
| Pencil Hardness | 3H | 3H | 2H–3H. |
| Flexibility (⅛″ mandrel) | Passed | Passed | Passed. |
| Impact (forward) Inch/pounds | 20 | 20 | 15. |
| Mar Resistance | Excellent | Excellent | Very good. |
| Toluol Resistance | do | do | Excellent. |

*Table VI*

Interpolymer solids—70%
Triazine resin A—15%
Oil modified alkyd resin A—15%

| | Modified Interpolymers | | |
|---|---|---|---|
| | A | B | C |
| Gloss Reading (photovolt 60°) | 92 | 92 | 90. |
| Pencil Hardness | 2H–3H | 2H–3H | 2H. |
| Flexibility (⅛″ mandrel) | Passed | Passed | Passed. |
| Impact (forward) Inch/pounds | 25 | 25 | 25. |
| Mar Resistance | Excellent | Very good | Very good. |
| Toluol Resistance | do | Excellent | Excellent. |

As will be evident from the test results reported hereinbefore, the present invention provides an extensive cure to provide extremely hard, solvent resistant coatings which, despite their hardness, have good flexibility and impact resistance.

In addition to excellent compatibility with aminoplast resins and oil-modified alkyd resins as has been specifically referred to hereinbefore, the interpolymers of the invention also possess excellent compatibility with epoxy resins such as polyglycidyl ethers of dihydric phenols, especially bisphenols, urea-formaldehyde resins, phenol-formaldehyde condensates, etc.

The invention is defined in the claims which follow.

I claim:

1. A non-gelled interpolymer of: (A) from 5–45% by weight of an acrylamide having its amido hydrogen atoms left unreacted; (B) at least one other polymerizable ethylenically unsaturated material comprising at least 20% by weight of monoethylenically unsaturated ester component in which the terminal carbon chain of the ester is of sufficient length to provide extensive internal plasticization; and (C) from 2–25% by weight of non-nitrogenous aliphatic monoethylenically unsaturated monomer containing the hydroxy group, said weight percentages being based upon the total weight of unsaturated polymerizable material.

2. An interpolymer as recited in claim 1 in which said unsaturated ester component is acrylate esters with alkanols containing at least two carbon atoms.

3. An interpolymer as recited in claim 1 in which said component (B) comprises from 1–15% by weight, based on the total weight of unsaturated polymerizable material, of monoethylenically unsaturated carboxylic acid.

4. An interpolymer as recited in claim 1 in which said monomer containing the hydroxy group is selected from the group consisting of hydroxy ethers and hydroxy esters of saturated aliphatic polyhydric alcohol with, respectively, ethylenically unsaturated monohydric alcohols and ethylenically unsaturated monocarboxylic acids.

5. An interpolymer as recited in claim 4 in which said monomer containing the hydroxy group is 2-hydroxy ethyl methacrylate.

6. An interpolymer as recited in claim 4 in which said monomer containing the hydroxy group is glycerol allyl ether.

7. An interpolymer as recited in claim 4 in which said component (C) is present in an amount of from 4–15% on said weight basis.

8. An interpolymer as recited in claim 7 in which said component (B) includes monomer selected from the group consisting of styrene, vinyl toluene and methyl methacrylate in an amount less than 30% on said weight basis.

9. An interpolymer as recited in claim 8 in which said component (B) includes an acid selected from the group consisting of acrylic and methacrylic acids in an amount of from 2–5% on said weight basis.

10. A heat-hardenable resinous composition comprising an organic solvent solution having dissolved therein a non-gelled interpolymer of: (A) from 5–30% by weight of acrylamide; (B) at least 40% by weight of acrylate ester in which the esterifying alcohol contains from 2–20 carbon atoms, monomer selected from the group consisting of styrene, vinyl toluene and methyl methacrylate in an amount less than 30% by weight, and from 1–15% by weight of aliphatic monoethylenically unsaturated carboxylic acid; and (C) from 4–15% by weight of 2-hydroxy ethyl methacrylate, said weight percentages being based on the total weight of unsaturated polymerizable material.

11. A heat-hardenable resinous composition comprising an organic solvent having dissolved therein the nongelled interpolymer of claim 1 and oil-modified alkyd resin.

12. A heat-hardenable resinous composition comprising an organic solvent having dissolved therein the nongelled interpolymer of claim 1 and an aminoplast resin.

13. A resinous composition as recited in claim 12 in which said aminoplast resin is a heat-hardening, solvent-soluble condensation product of a triazine with excess formaldehyde present in an amount of at least 20% by weight of the total weight of said interpolymer and said aminoplast resin.

14. A resinous composition as recited in claim 13 in which said organic solvent solution has still further dissolved therein oil-modified alkyd resin.

15. An article having a metal surface having as a coating thereon a heat-hardened film comprising the baked interpolymer of claim 1.

References Cited by the Examiner

UNITED STATES PATENTS

| | | | |
|---|---|---|---|
| 2,680,110 | 6/1954 | Laughran et al. | 260—80.5 |
| 2,718,515 | 9/1955 | Thomas | 260—80.5 |
| 2,940,943 | 6/1960 | Christenson et al. | 260—80.5 |
| 3,011,993 | 12/1961 | Kapalko et al. | 260—80.5 |

FOREIGN PATENTS 1,094,455  12/1960  Germany.

JOSEPH L. SCHOFER, *Primary Examiner.*

WILLIAM H. SHORT, *Examiner.*